US010582555B2

(12) United States Patent
Chau

(10) Patent No.: US 10,582,555 B2
(45) Date of Patent: *Mar. 3, 2020

(54) DEVICES AND METHODS FOR ESTABLISHING AN AD HOC PEER-TO-PEER NETWORK

(71) Applicant: Motorola Mobility LLC, Chicago, IL (US)

(72) Inventor: Seang Y Chau, Los Altos, CA (US)

(73) Assignee: Motorola Mobility LLC, Chicago, IL (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/971,978

(22) Filed: May 4, 2018

(65) Prior Publication Data
US 2018/0255599 A1 Sep. 6, 2018

Related U.S. Application Data

(63) Continuation of application No. 14/978,008, filed on Dec. 22, 2015, now Pat. No. 9,992,808.

(51) Int. Cl.
*H04W 4/00* (2018.01)
*H04W 76/15* (2018.01)
(Continued)

(52) U.S. Cl.
CPC ............. *H04W 76/15* (2018.02); *H04W 4/08* (2013.01); *H04W 4/80* (2018.02); *H04W 8/005* (2013.01);
(Continued)

(58) Field of Classification Search
None
See application file for complete search history.

(56) References Cited

U.S. PATENT DOCUMENTS 8,175,272 B2   5/2012   Braskich et al.
8,249,256 B2   8/2012   Korus et al.
(Continued)

OTHER PUBLICATIONS

"Specification of the Bluetooth System", Core System Package [Host Volume]; Cover Core Package version: 4.2, Specification vol. 3, Introduction, Dec. 2, 2014, 1-22 pages.
(Continued)

*Primary Examiner* — Bob A Phunkulh
(74) *Attorney, Agent, or Firm* — Philip H. Burrus, IV

(57) ABSTRACT

A node is operable to communicate in an ad hoc peer-to-peer network using a predefined communication protocol. The node includes a local area wireless communication circuit and one or more processors. The one or more processors can cause the local area wireless communication circuit to broadcast a local name of an electronic device using a discovery protocol of the predefined communication protocol. Upon receiving one or more responses from one or more remote devices, the one or more processors can change the local name to a new local name including at least one communication protocol parameter, and can cause the local area wireless communication circuit to rebroadcast the new local name using the discovery protocol to communicate the at least one communication protocol parameter to the one or more remote devices. This can continue until an ad hoc peer-to-peer network is established.

20 Claims, 6 Drawing Sheets

(51) Int. Cl.
*H04W 4/08* (2009.01)
*H04W 8/00* (2009.01)
*H04W 12/04* (2009.01)
*H04W 76/16* (2018.01)
*H04W 4/80* (2018.01)
*H04W 84/12* (2009.01)
*H04W 84/18* (2009.01)
*H04W 28/02* (2009.01)
*H04W 76/14* (2018.01)

(52) U.S. Cl.
CPC ............ *H04W 12/04* (2013.01); *H04W 76/16* (2018.02); *H04W 28/021* (2013.01); *H04W 76/14* (2018.02); *H04W 84/12* (2013.01); *H04W 84/18* (2013.01)

(56) References Cited

U.S. PATENT DOCUMENTS

| | | | |
|---|---|---|---|
| 8,527,013 | B2 | 9/2013 | Guba et al. |
| 8,578,159 | B2 | 11/2013 | Emeott et al. |
| 9,608,999 | B2 | 3/2017 | Somani et al. |
| 2004/0258032 | A1 | 12/2004 | Kawamure |
| 2005/0220221 | A1 | 10/2005 | Grignani |
| 2011/0182205 | A1 | 7/2011 | Gerdes et al. |
| 2013/0223280 | A1 | 8/2013 | Choi et al. |
| 2013/0223341 | A1 | 8/2013 | Kim et al. |
| 2013/0260688 | A1 | 10/2013 | Palin et al. |
| 2013/0288600 | A1 | 10/2013 | Kuusilinna et al. |
| 2013/0309971 | A1 | 11/2013 | Kiukkonen et al. |
| 2013/0331031 | A1 | 12/2013 | Palin et al. |
| 2014/0075523 | A1 | 3/2014 | Tuomaala et al. |
| 2014/0194062 | A1 | 7/2014 | Palin et al. |
| 2014/0195654 | A1 | 7/2014 | Kiukkonen et al. |
| 2014/0206286 | A1 | 7/2014 | Palin et al. |
| 2014/0206346 | A1 | 7/2014 | Kiukkonen et al. |
| 2014/0269465 | A1 | 9/2014 | Ballantyne et al. |
| 2014/0355517 | A1* | 12/2014 | Reunamaki ............ H04W 8/005 370/328 |
| 2015/0195008 | A1 | 7/2015 | Johnson et al. |
| 2015/0289124 | A1 | 10/2015 | Palin et al. |
| 2015/0319595 | A1 | 11/2015 | Hakola et al. |
| 2015/0350279 | A1 | 12/2015 | Palin et al. |
| 2015/0373749 | A1 | 12/2015 | Palin et al. |
| 2016/0157078 | A1* | 6/2016 | Palin ..................... H04W 8/005 455/41.2 |
| 2016/0192151 | A1 | 6/2016 | Marri Sridhar |
| 2016/0234626 | A1 | 8/2016 | Ray et al. |
| 2016/0381726 | A1* | 12/2016 | O Donnabhain ..... H04W 4/025 370/329 |

OTHER PUBLICATIONS

"Specification of the Bluetooth System", Core System Package [Host Volume]; Cover Core Package version: 4.2, Specification vol. 3, Part A, Dec. 2, 2014, 23-214 pages.

"Specification of the Bluetooth System", Core System Package [Host Volume]; Cover Core Package version: 4.2, Specification vol. 3, Part c, Dec. 2, 2014, 276-410 pages.

"Specifiction of the Bluetooth System", Core System Package [Host Volume]; Cover Core Package version: 4.2, Specification vol. 3, Part B, Dec. 2, 2014, 215-275 pages.

Camps-Mur, Daniel et al., "Device to device communications with WiFi Direct: overview and experimentation", http://ww.it.uc3m.es/pablo/papers/pdf/2012_camps_wifidirect.pdf, Jun. 2, 2015, 8 pages.

Phunkulh, Bob, "NonFinal OA", U.S. Appl. No. 14/978,008, filed Dec. 22, 2015; dated Aug. 9, 2017.

Phunkulh, Bob A., "Notice of Allowance", U.S. Appl. No. 14/978,008, filed Dec. 22, 2015; dated Feb. 8, 2018.

* cited by examiner

DEVICES AND METHODS FOR ESTABLISHING AN AD HOC PEER-TO-PEER NETWORK

CROSS REFERENCE TO PRIOR APPLICATIONS

This application is a continuation application, and therefore claims priority and benefit under 35 U.S.C. § 120 from, U.S. application Ser. No. 14/978,008, filed Dec. 22, 2015, which is incorporated by reference for all purposes.

BACKGROUND

Technical Field

This disclosure relates generally to electronic devices, and more particularly to electronic devices with networking capabilities.

Background Art

Configuring electronic devices to automatically communicate presents a version of the proverbial "chicken and egg" problem. In traditional Wi-Fi and ad hoc networks, a first device serves as an access point, while another device serves as a client. The access point is configured with the communication parameters of the network. The device joining the network is a client. To find the access point, the client needs to know communication parameters of the access point's network. However, the client needs to receive this network information from the access point. If the client device does not have the communication parameters of the network, it cannot find the access point. At the same time, unless the access point can communicate with another device, e.g., the client, there is no network. Accordingly, its network parameters are worthless because if the client knows who the access point is, it can create its own network. Thus, it needs to know the access point to get network communication parameters, but knowledge of the access point renders the requirement of these communication parameters moot.

The traditional way of solving this is for a user to program network communication parameters into the client, thereby allowing the client to join the access point on a designated network. There are many techniques for doing this, including those in the IEEE 802.11 standard, which is used for Wi-Fi technology. While this works well in practice, it is slow and tedious as the client device is unable to "automatically" begin communicating with a particular network due to the problems mentioned above. These problems are exacerbated in establishing device-to-device piconets due to the fact that only two devices are in the network. While the 802.11 standard sets forth device-to-device network establishment protocols communication on a device-to-device basis with 802.11z, these still require an access point and a corresponding association.

It would be advantageous to have an improved method and system for establishing ad hoc peer-to-peer networks.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
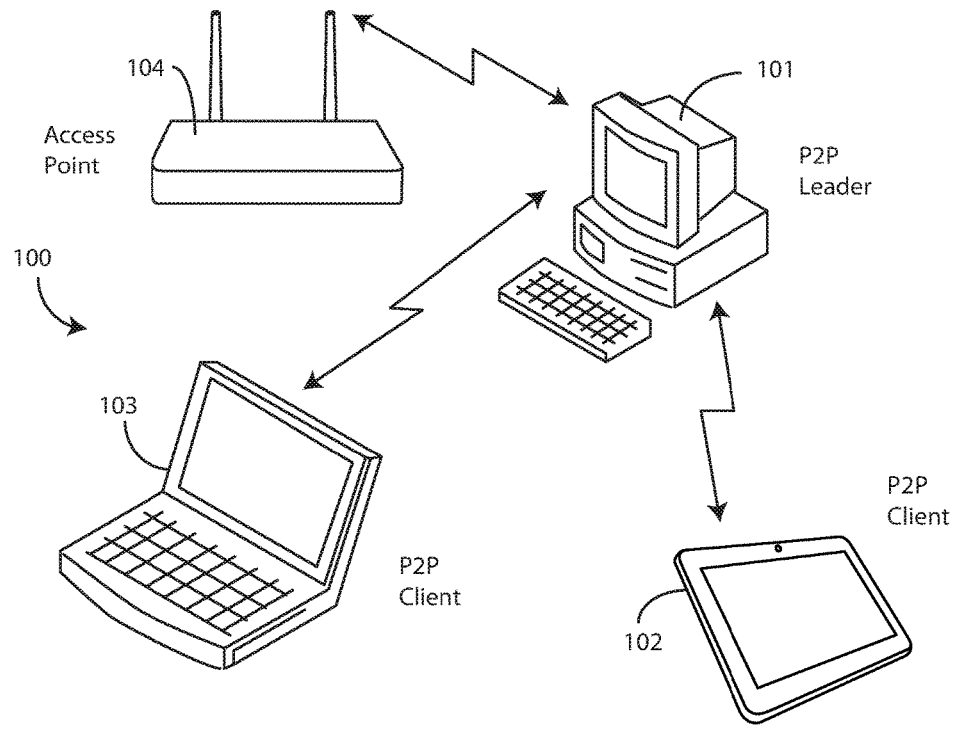
FIG. 1 illustrates a prior art network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to establishing an ad hoc peer-to-peer network in accordance with one or more embodiments of the disclosure. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user wireless communication technology, enable devices to communicate directly using discovery protocols rather than complicated networking communication establishment techniques.

It will be appreciated that embodiments of the disclosure described herein may be comprised of one or more conventional processors and unique stored program instructions that control the one or more processors to implement, in conjunction with certain non-processor circuits, some, most, or all of the functions of establishment of ad hoc peer-to-peer networks as described herein. The non-processor circuits may include, but are not limited to, a radio receiver, a radio transmitter, signal drivers, clock circuits, power source circuits, and user input devices. As such, these functions may be interpreted as steps of a method to perform the establishment of ad hoc peer-to-peer networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide devices, methods, and systems for establishing an ad hoc peer-to-peer network. Instead of requiring complicated discovery, handshaking, negotiation, and authentication protocols of prior art techniques, embodiments of the disclosure broadcast, using a predefined device discovery protocol, a local name of an electronic device. Then, by sequentially changing the name to include one or more communication protocol parameters required for communication in the ad hoc peer-to-peer network, devices sequentially communicate the necessary parameters to establish the network. Advantageously, two devices can receive all necessary communication protocol parameters simply by listening to a series of changing name broadcasts using a predefined device discovery protocol.

Illustrating by example, in one embodiment a first device can generate and broadcast a local name of the device using a device discovery protocol of a predefined communication protocol. Examples of predefined communication protocols suitable for use with embodiments of the disclosure include Bluetooth.sup.™, Bluetooth Low Energy.sup.™, Wi-Fi discovery via broadcast Service Set Identifier (SSID), and other protocols. In one or more embodiments, the device then changes the local name to a new local name, sometimes referred to as a dynamic identification or "dynamic ID," that can include an indication of the device name and real time information of the critical communication protocol parameters required to communicate on the network. The device can broadcast this changing dynamic ID at predefined time intervals to deliver the key communication protocol parameters, authentication information, and handshaking information required for listening devices to establish ad hoc peer-to-peer communications with the device. The listening devices receive the sequentially changing dynamic IDs and process the information in accordance with locally stored instructions to establish the ad hoc peer-to-peer network.

As used herein, an "ad hoc peer-to-peer" network is a self-forming network that includes at least two devices that can, in accordance with one or more embodiments of the disclosure, establish communication with or without any fixed infrastructure. In one or more embodiments, the ad hoc peer-to-peer network can be formed entirely of electronic devices—with as few as two electronic devices—that wirelessly communicate only with each other. In other embodiments, wireless devices can use systems and methods described herein to begin communication with other devices that have a device infrastructure or wired network basis. Where only two devices use embodiments of the disclosure for communication, the ad hoc peer-to-peer network is considered to be a "single hop" piconet.

In one or more embodiments, a first device broadcasts, with a local area wireless communication circuit of an electronic device, a local name of the electronic device using a predefined device discovery protocol. As noted above, in one embodiment the predefined device discovery protocol is the Bluetooth.sup.™ device discovery protocol. In another embodiment, the predefined device discovery protocol is the SSID broadcasting protocol associated with Wi-Fi networks. Other suitable predefined device discovery protocols will be obvious to those of ordinary skill in the art having the benefit of this disclosure. Regardless of the predefined device discovery protocol used, in one or more embodiments, after broadcasting the device name, the first device receives, with the local area wireless communication circuit, one or more responses from one or more remote electronic devices using the predefined device discovery protocol.

In one embodiment, upon determining that other devices are listening, the first device then changes, with one or more processors operable with the local area wireless communication circuit, the local name to a new local name. In one or more embodiments, the new local name includes at least one communication protocol parameter selected from a predefined plurality of communication protocol parameters required for communication in the ad hoc peer-to-peer network. The first device then rebroadcasts the new local name using the predefined device discovery protocol to communicate the at least one communication protocol parameter to the one or more remote devices.

This process can then continue, with the first device continually changing the new device name by substituting, in the new local name, at least another communication protocol parameter for the at least one communication protocol parameter. The process can repeat until each communication protocol parameter of the predefined plurality of communication protocol parameters is communicated between the electronic device and the one or more remote electronic devices. The remote devices can then process the network information received from listening to the name broadcasts of the discovery protocol to begin communicating with the first device. Advantageously, embodiments of the disclosure provide an energy efficient technique for the devices to seamlessly discover and connect to each other using only a device discovery protocol.

Turning now to FIG. 1, illustrated therein is a prior art network 100. Prior art networks 100 such as that shown in FIG. 1 can take the form of mesh or other networks communicating in accordance with the 802.11 standard mentioned above. As shown in FIG. 1, the prior art network 100 includes a plurality of electronic devices, known as nodes 101,102,103,104. Here, node 104 is a gateway router operating in a local access network (LAN) to provide the other nodes 101,102,103 with access to other networks, such as the Internet.

In one embodiment, the various nodes 101,102,103,104 establish communication and link security using an IEEE 802.1X protocol. As noted above, this requires at least one device, i.e., node 104, to be an access point. Client nodes, e.g., nodes 102,103, can then discover and associate the prior art network 100 from communications with an access point. Here, node 101 also functions as an access point, with the remaining nodes 102,103 defining client devices that join the network by communicating with node 101 on a peer-to-peer basis. During communication establishment, communication protocol parameters are exchanged when the nodes 101,102,013 perform some form of IEEE 802.1X authentication using an extensible authentication protocol (EAP) authentication method.

Figure 2:
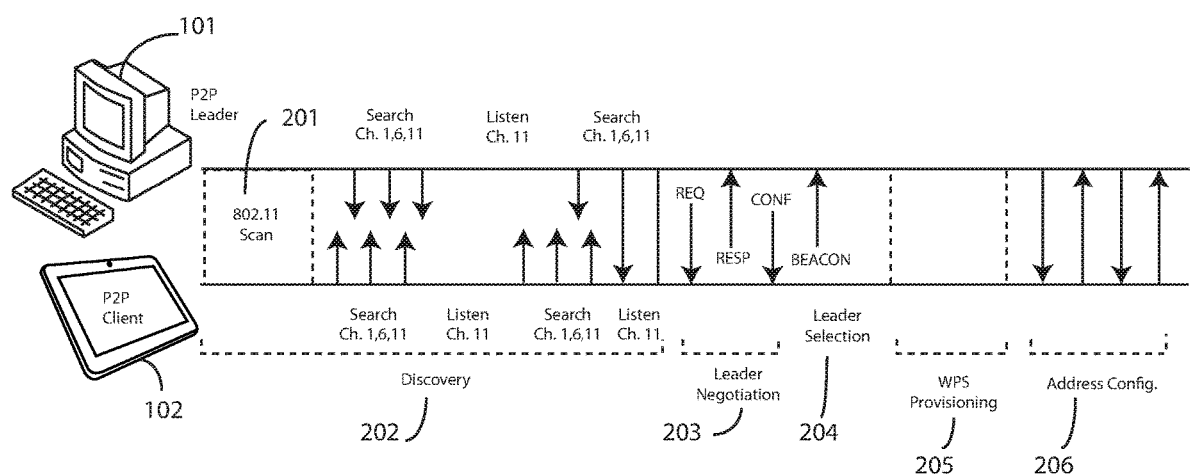
FIG. 2 illustrates a prior art network establishment protocol.

Turning now to FIG. 2, illustrated therein is one example of such an authentication protocol 200. The prior art authentication protocol 200 requires that node 101 and node 102 negotiate their roles to establish communication. One node 101 has to be the leader, the other the client. Since node 101 was initially in communication with node (104), it has network communication protocol parameters and needs to establish itself as the leader through negotiation. Node 101 must also execute a dynamic host configuration protocol (DHCP) to provide node 102 with Internet protocol (IP) addresses. Additionally, in prior art systems, the leader is the only node allowed to cross-connect the devices in its peer-to-peer network. Accordingly, for this to happen, node 101 must establish a connection at the network layer, generally using network address translation (NAT).

In this prior art authentication protocol 200, node 101 and node 102 must first discover each other using a discovery algorithm 202. In one embodiment, this includes performing a Wi-Fi scan 201 in accordance with the 802.11 protocols. After this scanning procedure, the prior art authentication protocol 200 enters a discovery algorithm 202. During the discovery algorithm 202, channels must be selected as social and listen channels. Devices then alternate between search states where active scanning is performed on social channels and listening states where it receives probe responses are received on listen channels.

Once the discovery algorithm 202 is complete, leadership negotiation 203 must occur. This requires a three-way handshake that includes a request transmission, a response reception, and a confirmation, and results in node 101 and node 102 agreeing that node 101 will be the leader at leadership decision 204. During the leadership negotiation 203, the nodes 101,102 also select a channel across which communications will occur. Once this step is complete, secure communication must be established using WPS provisioning 205 and address configuration 206.

As will be appreciated from viewing the authentication protocol 200, the process is complex in that numerous negotiations must occur, including channel selection, which channels are social channels and which are listening channels, which device is the leader, what the addresses are, and so forth. Additionally, this authentication protocol occurs across different layers of the stack. As noted above, prior art techniques require at least a negotiation at the network layer for optimal routing protocol decisions to establish the required cross-connect governance for the devices.

By contrast, embodiments of the present disclosure allow the establishment of ad hoc peer-to-peer networks only at the application layer of the stack using a unique name-changing method of delivering communication protocol parameters with only a device discovery protocol of a predefined communication protocol such as Bluetooth.sup.™ or other similar systems. By changing, with one or more processors operable with a local area wireless communication circuit, a device's local name to include at least one communication protocol parameter selected from a plurality of communication protocol parameters required for communication in the ad hoc peer-to-peer piconet to form a new local name, broadcasting the new local name, and repeating the process to transfer all necessary communication protocol parameters between devices, embodiments of the disclosure provide a seamless and more energy efficient mechanism for two or more nodes to discover and connect to each other. Illustrating by example, when a local area communication circuit, such as a Bluetooth Low Energy.sup.™ circuit, is operating in its discovery mode, the circuit may consume less than a tenth of a watt of power. By contrast, a wireless communication circuit executing the Wi-Fi authentication protocol 200 of FIG. 2 will consume 2-3 watts in many instances. Accordingly, embodiments of the disclosure provide methods and techniques for establishing ad hoc peer-to-peer networks that are more energy efficient and that only require the application layer of the stack for communication protocol transfer.

Figure 3:
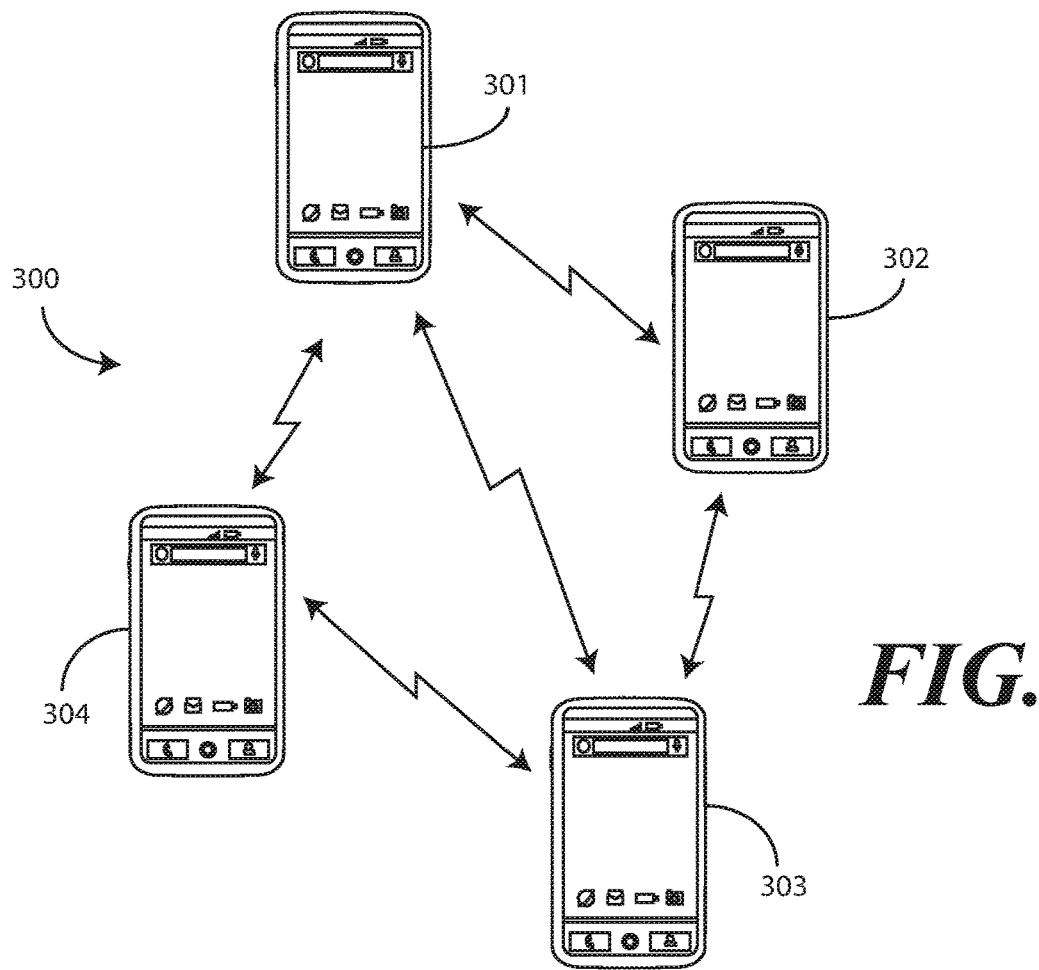
FIG. 3 illustrates an ad hoc peer-to-peer network in accordance with one or more embodiments of the disclosure.

Turning now to FIG. 3, illustrated therein is one explanatory ad hoc peer-to-peer network 300 in accordance with one or more embodiments of the disclosure. As shown in FIG. 3, one or more nodes 301,302,303,304 communicate with each other. In one or more embodiments, each node, e.g., node 301, is capable of communicating directly with another node 302,303,304 on a one-hop basis. In some embodiments, the nodes 301,302,303,304 are configured to communicate with other nodes on a multi-hop basis. Here, for example, node 303 communicates with node 301 on a two-hop basis.

It should be noted that the nodes 301,302,303,304 can be any type of a variety of devices that includes wireless communication capabilities. While the nodes 301,302,303, 304 of FIG. 3 are shown as all being smartphones for ease of illustration, embodiments of the disclosure are not so limited. The nodes 301,302,303,304 could also be desktop, laptop, netbook, or tablet computer, mobile communication devices, personal digital assistants, gaming devices, media players, tablet or palmtop computers, and so forth. Other types of nodes will be obvious to those of ordinary skill in the art having the benefit of this disclosure.

Figure 4:
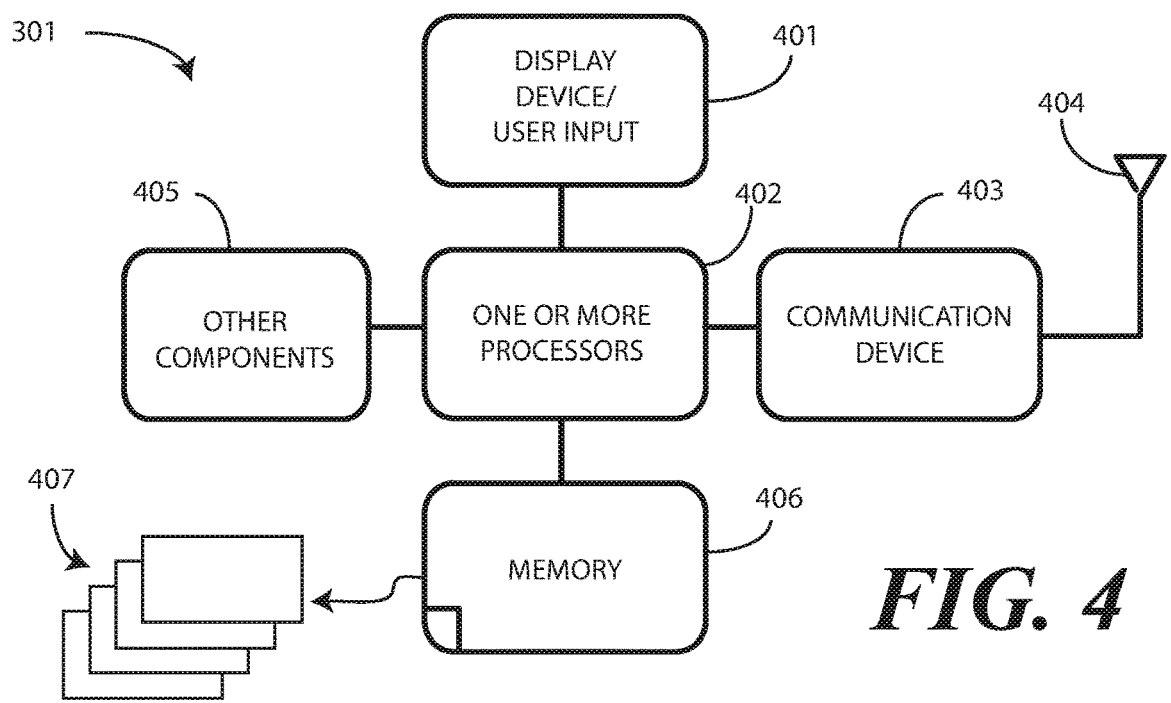
FIG. 4 illustrates a schematic block diagram of one device in accordance with one or more embodiments of the disclosure.

Turning now to FIG. 4, illustrated therein is a schematic block diagram of one illustrative node 301. A display or other user interface 401 can be disposed along a housing of the node 301 to receive user input. The display or other user interface 401 can also be configured to provide visual output, images, or other visible indicia to a user. For example, the display or other user interface 401 can include an organic light emitting diode (OLED) device to render the images or visible indicia. The display or other user interface 401 can include a touch sensor to receive user input. The display or other user interface 401 can also be configured with a force sensor. Where so configured, one or more processors 402 of the node 301 can be operable with the touch sensor and the force sensor to determine not only where the user contacts the display or other user interface 401, but also how much force the user employs in making the contact.

In one or more embodiments, the node 301 also includes a wireless communication circuit 403. The wireless communication circuit 306 can include wireless communication circuitry, one of a receiver, a transmitter, or transceiver, and one or more antennas 307. In one or more embodiments, the wireless communication circuit 403 is capable of communicating with one or more remote devices across a wide area network, local area network, small local area network (piconet), or personal area networks.

Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. Examples of local area networks include HomeRF, Bluetooth.sup.™, and IEEE 802.11 (a, b, g or n) or other similar Wi-Fi networks. Examples of ad hoc peer-to-peer networks include the one-hop and two-hop communication networks shown above with reference to FIG. 3, with the former being referred to as a "piconet."

Figure 5:
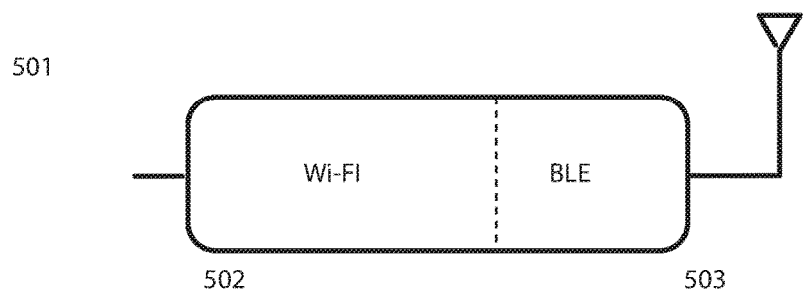
FIG. 5 illustrates an explanatory wireless communications circuit in accordance with one or more embodiments of the disclosure.

Turning briefly to FIG. 5, in one embodiment the wireless communication circuit (403) comprises a local area network front end 501 configured as a single integrated circuit that includes multiple types of local area network communication protocols. For example, the local area network front end 501 of FIG. 5 includes both a Wi-Fi circuit 502 and another local area wireless communication circuit 503. The Wi-Fi circuit 502 is configured to communicate via an IEEE 802.11 protocol, while the other local area wireless communication circuit 503 is configured to communicate with a communication protocol other than the 802.11 standard.

In one or more embodiments, the other local area wireless communication circuit 503 includes a predefined discovery protocol by which the corresponding node (301) can search for other devices. In one or more embodiments, when operating in the discovery mode using the discovery protocol, the other local area wireless communication circuit 503 can scan for devices that broadcast their identities in accordance with the predefined discovery protocol, i.e., at predefined times, on predefined channels, and in accordance with predefined communication protocol parameters. In one or more embodiments, communications under the predefined discovery protocol occur at the application layer of the stack.

One example of such a communication protocol with such a predefined discovery protocol is the Bluetooth.sup.™ communication protocol. When operating in the predefined discovery protocol, Bluetooth.sup.™ devices execute one or more steps that include broadcasting a local device name, as well as storing the names of remote devices received in accordance with the protocol. The Bluetooth.sup.™ discovery protocol can also include filtering and processing device names. These filtered and/or processed device names can then be further processed by one or more processors (402) in accordance with one or more method steps set forth below. Where the other local area wireless communication circuit 503 comprises a Bluetooth.sup.™ or Bluetooth Low Energy.sup.™ circuit, the local area network front end 501 comprises a combined WiFI/Bluetooth.sup.™ integrated circuit.

While Bluetooth.sup.™ is one explanatory communication protocol suitable for use with embodiments of the disclosure, embodiments are not so limited. Any local area network communication protocol that includes a predefined device discovery protocol operating at the application layer of the stack can be substituted and used with method steps and system components set forth here. Illustrating by example, in another embodiment the predefined device discovery protocol employs broadcast SSID data in a Wi-Fi network. Accordingly, other such communication protocols will be obvious to those of ordinary skill in the art having the benefit of this disclosure.

Turning now back to FIG. 4, the node 301 also includes one or more processors 402 that are operable with the wireless communication circuit 403. The one or more processors 402 are responsible for performing the various functions of the device. The one or more processors 402 can be a microprocessor, a group of processing components, one or more Application Specific Integrated Circuits (ASICs), programmable logic, or other type of processing device. The one or more processors 402 can be operable with the display or other user interface 401, as well as various peripheral devices, ports, or connectors 405.

The one or more processors 402 can be configured to process and execute executable software code to perform the various functions of the node 301. A storage device, such as memory 406, stores the executable software code used by the one or more processors 402 for device operation. The executable software code used by the one or more processors 402 can be configured as one or more modules 310 that are operable with the one or more processors 402. Such modules 407 can store instructions, control algorithms, and so forth.

In one embodiment, the one or more processors 402 are responsible for running the operating system environment of the node 301. The operating system environment can be configured as executable code operating on one or more processors 402 or control circuits of the node 301. The operating system environment can include a kernel, one or more drivers, and one or more layers of a protocol stack. These layers can include an application service layer, a network layer, a physical layer, a protocol layer, an application layer, and other layers, such as an anticollision layer and a transfer layer. Each layer can operate in accordance with one or more activity parameters.

In one embodiment, the physical layer is the top-level layer of the protocol stack, known as "layer 1," with the other layers above the physical layer. For example, in one embodiment the protocol stack includes the physical layer as the top layer, a data link layer as the second layer, the network layer as layer three, a transport layer as the fourth layer, a session layer as the fifth layer, the presentation layer as the sixth layer, and an application layer as the seventh layer.

As noted above, in one or more embodiments the one or more processors 402 execute a discovery protocol to establish ad hoc peer-to-peer network communications at the application layer. In one embodiment, the one or more processors 402 only execute a discovery protocol to establish ad hoc peer-to-peer network communications at the application layer. The application layer can be responsible for executing application service modules. The application service modules may support one or more applications or "apps." Examples of such applications shown in FIG. 3 include a near-field communication application for near-field wireless communication applications, a cellular telephone application for making voice telephone calls, a web browsing application configured to allow the user to view webpages, an electronic mail application configured to send and receive electronic mail, a photo application configured to permit the user to view images or video, and a camera application configured to capture still (and optionally video) images. These applications are illustrative only, as others will be obvious to one of ordinary skill in the art having the benefit of this disclosure.

The one or more processors 402 can be configured to one or more of launch one of the apps and/or enable data communication with one of the apps. In one or more embodiments, the one or more processors 402 are responsible for managing the applications and all data communications of the node 301. Accordingly, the one or more processors 402 can be responsible for launching, monitoring and killing the various applications and the data communication with the various applications in response to receipt of messages, data payloads, and so forth as described above. The applications of the application layer can be configured as clients of the application service layer to communicate with services through application program interfaces (APIs), messages, events, or other inter-process communication interfaces.

Turning now to FIG. 5, illustrated therein is a signal flow diagram 500 for the node 301 to establish communication with a remote device in an ad hoc peer-to-peer network using a predefined communication protocol, such as Bluetooth.sup.™, defined by a predefined plurality of communication protocol parameters. In one embodiment, the one or more processors (402) cause a local area wireless communication circuit (503) to broadcast 601 a local name 602 of the node 301 using a discovery protocol of the predefined communication protocol.

Illustrating by example, where the predefined communication protocol is the Bluetooth Low Energy.sup.™ protocol, the discovery protocol can include data needed to identify a mobile device, including, e.g., a device class, device manufacturer, and/or serial number. The device name may have a common name or nickname, a public session initiation protocol uniform resource identifier, and/or a device identifier such as an International Mobile Equipment Identity (IMEI) number. The device name may be in a predefined format set forth by the predefined communication protocol. Moreover, the device name may be encoded using a coding protocol.

In one embodiment, the node 301 then receives 603 a response 604 to the broadcast 601 from one or more remote nodes 302,303,304. In one or more embodiments, the response 604 is an acknowledgement of the initial broadcast 601.

In one embodiment, upon receiving 604 the response 604 to the broadcast 601, the one or more processors (402) then change 605 the local name 602 to a new local name 606. In one or more embodiments, the new local name 606 includes at least one communication protocol parameter selected from the predefined plurality of communication protocol parameters of the predefined communication protocol.

The at least one communication protocol parameter can be any parameter that the remote nodes 302,303,304 require for communication on the ad hoc peer-to-peer network in accordance with the predefined communication protocol. Illustrating by example, the communication protocol parameter may be a password, a network identifier, an authentication key, a "pairwise master key (PMK)," authentication request information, authentication verification information, or other data that is used for communication. The communication protocol parameter can also include minimum connection interval information, maximum connection interval information, slave latency, timeout multipliers, and so forth.

The communication protocol parameter can also include supervision advertising minimal intervals, supervision advertising maximum intervals, and supervision timeout parameters. Still additional communication protocol parameters can include passkeys, security keys, reserve parameters, security parameters, and so forth. Other examples of communication protocol parameters will be obvious to those of ordinary skill in the art having the benefit of this disclosure.

In one or more embodiments, the new local name 606 will include both an indication of the local name 602 and the at least one communication protocol parameter. In one or more embodiments, the indication of the local name 602 and the communication protocol parameter can be separated by a key, such as a comma or colon. For example, if the local name 602 were Node1;Bob;IMEI123495607968, where Node 1 is the device formal name, Bob is the device nickname, and IMEI123495607968 is a device identifier, the new local name 606 may be Bob:CommunicationProtocolParameter1, where the colon is used to separate an indication of the local name 602, i.e., the device nickname in this example, and the first communication protocol parameter. Accordingly, the one or more remote devices 302,303,304 can parse the communication protocol parameters from name information to, with each successive broadcast, compile the information required to communicate on the ad hoc peer-to-peer network.

After changing the local name 602 to the new local name 606, the one or more processors (402) then cause the local area wireless communication circuit (503) to rebroadcast 607 the new local name 606 using the predefined device discovery protocol to communicate the at least one communication protocol parameter to the one or more remote nodes 302,303,304. This process can then repeat, with the one or more processors (402) continuing to change 608 the local name 602 by substituting in the new local name at least another communication protocol parameter for the at least one communication protocol parameter. Illustrating by example, the new local name 606 includes a second communication protocol parameter after the indication of the device name and the key. In one or more embodiments, the one or more remote nodes 302,303,304 are configured with modules in memory with which their one or more processors can collect the communication protocol parameters in a serial manner. Once the necessary communication protocol parameters required for communication in the ad hoc peer-to-peer network are collected, the one or more remote nodes 302,303,304 can begin communicating with node 301.

Figure 6:
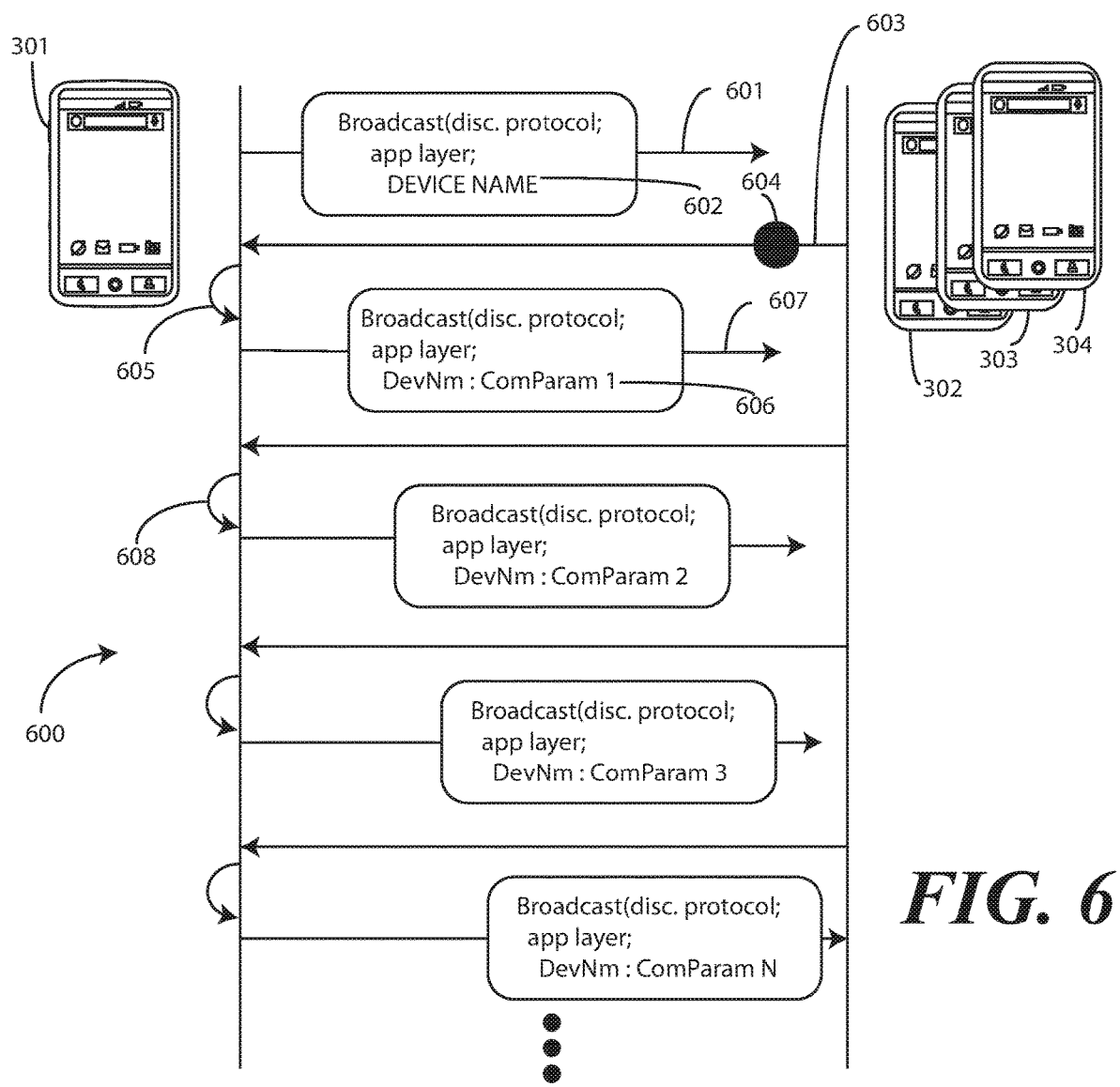
FIG. 6 illustrates one explanatory signal flow diagram for a system in accordance with one or more embodiments of the disclosure.

In the embodiment of FIG. 6, node 301 will become the group leader of the ad hoc peer-to-peer network due to the fact that it is responsible for delivering each of the communication protocol parameters to the one or more remote nodes 302,303,304. However, in other embodiments, multiple nodes can be operating in concert to broadcast a local name of the electronic device using a predefined device discovery protocol, receive one or more responses to the broadcasting of the local name from one or more remote electronic devices using the predefined device discovery protocol, change the local name to a new local name including at least one communication protocol parameter, and rebroadcast the new local name using the predefined device discovery protocol to communicate the at least one communication protocol parameter to the one or more remote devices. Moreover, in many instances it may be advantageous for one particular node to serve as the leader over another. This may be true because one node has knowledge of a particular network or access point that may be useful to other nodes of the ad hoc peer-to-peer network. Alternatively, one node may be in communication with other devices such as printers, peripherals, or servers that are useful to the other nodes of the ad hoc peer-to-peer network. Other reasons for one node taking priority in an ad hoc peer-to-peer network will be obvious to those of ordinary skill in the art having the benefit of this disclosure.

Figure 7:
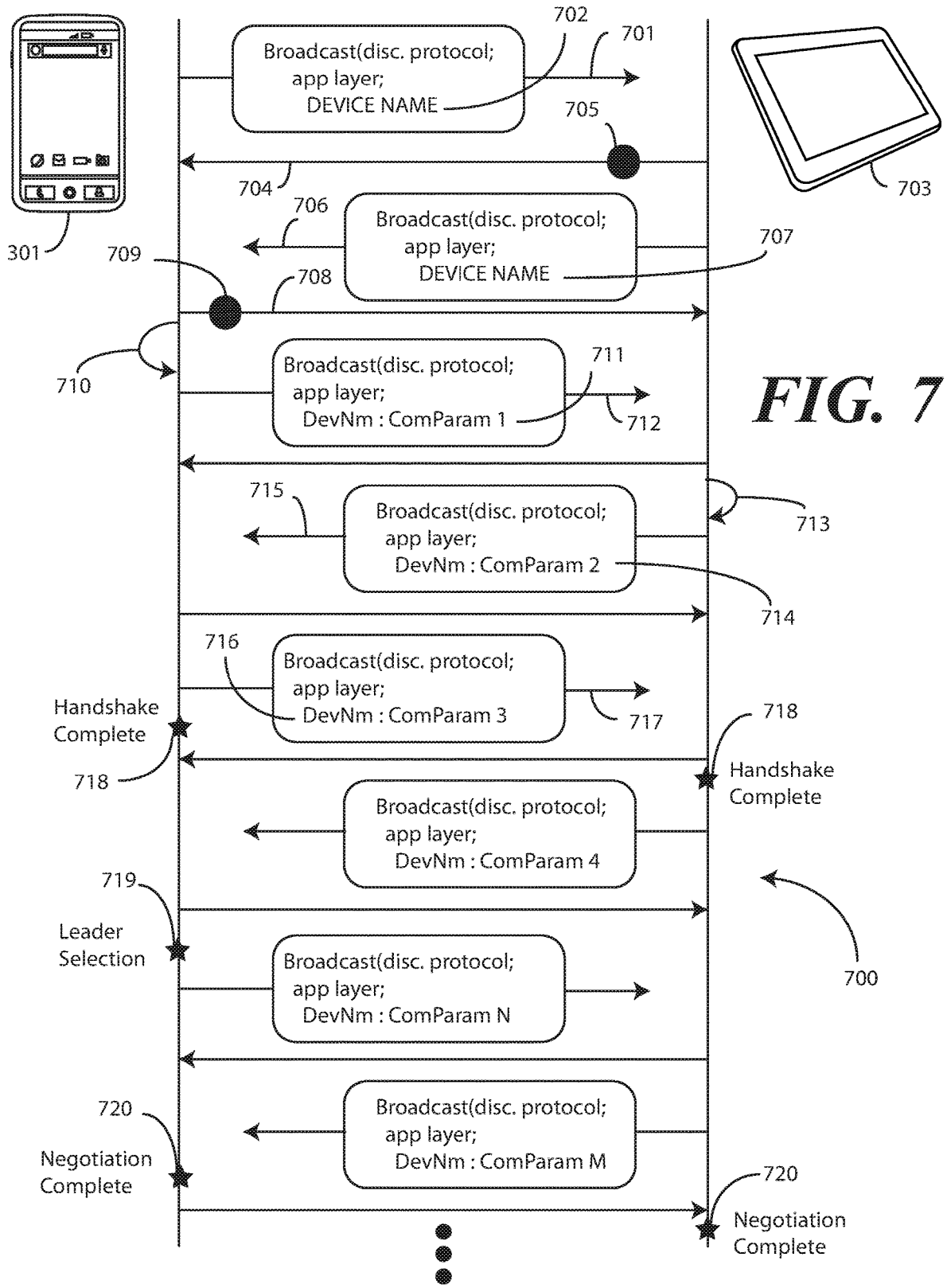
FIG. 7 illustrates one explanatory signal flow diagram for a system in accordance with one or more embodiments of the disclosure.

Turning now to FIG. 7, illustrated therein is another signal flow diagram 700 that allows for negotiation in the establishment of the ad hoc peer-to-peer network using the discovery communication protocol. In one embodiment, the one or more processors (402) of a first node 301 cause a local area wireless communication circuit (503) to broadcast 701 a local name 702 of the node 301 using a discovery protocol of the predefined communication protocol. In one embodiment, the node 301 then receives 704 a response 705 to the broadcast 701 from the second node 703 as an acknowledgement of the initial broadcast 701.

Since the second node 703 operates in accordance with one or more embodiments of the disclosure, it too can broadcast 706 its local device name 707 to the first node 301. This broadcast 706 can be in addition to, or instead of, the acknowledgement sent in response 705. Optionally, the first node 301 can transmit 708 a response 709 to the broadcast 706 to the second node 703 as an acknowledgement.

The first node 301 and the second node 703 can then negotiate by transmitting modified names using the device discovery communication protocol. For example, the first node 301 can then change 710 the local name 702 to a new local name 711 that includes at least one communication protocol parameter selected from the predefined plurality of communication protocol parameters of the predefined communication protocol with which communication will occur in the ad hoc peer-to-peer network. This can be broadcast 712 to the second node 703. Similarly, the second node can change 713 its local device name 707 to a new local device name 714 that includes at least one communication protocol parameter selected from the predefined plurality of communication protocol parameters of the predefined communication protocol with which communication will occur in the ad hoc peer-to-peer network. This can be broadcast 71715 to the first node node 301.

In one embodiment, when changed device names are received form other nodes, e.g., when new local device name 714 is received by first node 301 from second node 703, the selection process by which the next communication protocol parameter will be inserted into the new device name can be a function of the received new local device name 714. Illustrating by example, if the communication protocol parameter of new local device name 714 indicates that the second node 703 is in communication with the Internet via an access point, and the first node 301 is not in communication with the Internet, the communication protocol parameter in new local device name 716, broadcast 717 from the first node 301 to the second node 703 may be different than if the communication protocol parameter of new local device name 714 indicates that the second node 703 wants to be a client of the first node 301.

In another embodiment, both the first node 301 and the second node 703 could be configured with a table of communication protocol parameters. Optionally, this table can be arranged with ascending priority such that communication protocol parameters can be exchanged in a predefined order. Thus, if the first node 301 would typically send a second communication protocol parameter in new local device name 716, but receives the second communication protocol parameter from the second node 703 in new local device name 714, it may instead send a third communication protocol parameter in new local device name 716. Accordingly, the first node 301 can receive, with the local area wireless communication circuit (503), a remote device local name, e.g., new local device name 714, from a remote electronic device, e.g., second node 703, using the device discovery communication protocol, where the remote device local name comprises at least another communication protocol parameter.

This exchange can continue until the first node 301 and the second node 703 perform ad hoc peer-to-peer network establishment functions such as handshaking 718 or selecting 719 a group leader of the ad hoc peer-to-peer network as a function of the exchanged communication protocol parameters. This can further continue until negotiation 720 is completed and the ad hoc peer-to-peer network is established. Said differently, the rebroadcasting new device local name can repeat to perform an authentication operation, a handshaking operation, a leader selection operation, or other operation to establish communication between nodes in the ad hoc peer-to-peer network.

Figure 8:
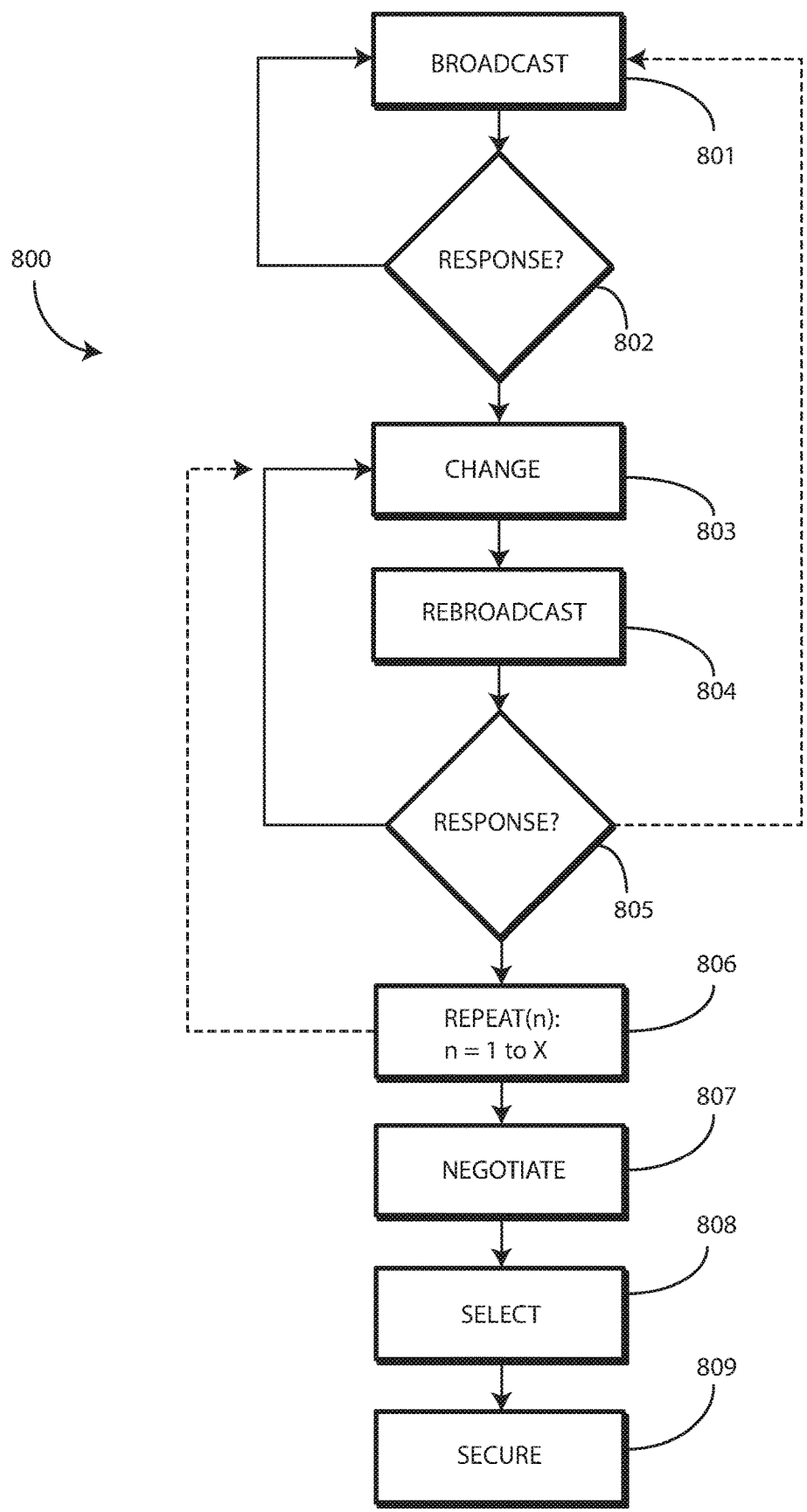
FIG. 8 illustrates one explanatory method in accordance with one or more embodiments of the disclosure.

Turning now to FIG. 8, illustrated therein is a method 800 of establishing an ad hoc peer-to-peer network. At step 801, the method 800 broadcasts, with a local area wireless communication circuit of an electronic device, a local name of the electronic device using a predefined device discovery protocol of a predefined communication protocol. In one or more embodiments, the predefined device discovery protocol operates at an application layer of the electronic device. In one explanatory embodiment, the predefined device discovery protocol comprises a Bluetooth.sup.™ device discovery protocol. However, as noted above, other communication protocols including predefined device discovery protocols will be obvious to those of ordinary skill in the art having the benefit of this disclosure.

At decision 802, the method determines whether other devices using the device discovery protocol are within a communication range. In one embodiment, this decision 802 includes receiving, with the local area wireless communication circuit, one or more responses to the broadcasting of the local name from one or more remote electronic devices using the predefined device discovery protocol. Alternatively, in another embodiment, this decision 802 comprises receiving a remote device local name of a remote electronic device using the device discovery communication protocol. The remote device local name can include at least another communication protocol parameter.

At step 803, the method 800 changes, with one or more processors operable with the local area wireless communication circuit, the local name to a new local name. In one or more embodiments, the new local name includes at least one communication protocol parameter selected from a predefined plurality of communication protocol parameters required for communication in the ad hoc peer-to-peer network. In one embodiment, the new local name comprises an indication of the local name, such as a nickname, pseudonym, device identifier, or other indicator, and the at least one communication protocol parameter. In one or more embodiments, the indication of the local name and the at least one communication protocol parameter are separated by a key. Examples of keys include spaces, semicolons, colons, dashes, and other special characters present in a QWERTY keyboard.

At step 804, the method 800 includes rebroadcasting, with the local area wireless communication circuit, the new local name using the predefined device discovery protocol to communicate the at least one communication protocol parameter to the one or more remote devices.

At optional decision 805, the method 800 can listen for responses from remote devices. In one embodiment, this decision 805 can include receiving, with the local area wireless communication circuit, a simple device discovery protocol acknowledgement as one or more responses from one or more remote electronic devices using the device discovery protocol. However, in other embodiments where the remote devices are configured in accordance with one or more embodiments of the disclosure, this decision 805 can include receiving, with the local area wireless communication circuit, a remote device local name of a remote electronic device using the predefined device discovery protocol where that remote device local name comprises at least another communication protocol parameter.

Steps 803-804 and decision 805 can optionally repeat, as shown at step 806. The repeating of step 806 can include repeating the changing at step 803 by substituting in the new local name at least another communication protocol parameter for the at least one communication protocol parameter. The repeating of step 806 can further include repeating the rebroadcasting of the new local name at step 804, and repeating the listening for responses at optional decision 805. In one or more embodiments, the repeating of step 806 can continue until each communication protocol parameter of the predefined plurality of communication protocol parameters is communicated between the electronic device and the one or more remote electronic devices.

Several actions can result from one or more of the repeating steps of step 806. In one embodiment, after one or more exchanges of communication protocol parameters the method 800 can negotiate, as shown at step 807, rules and roles of the electronic devices in the ad hoc peer-to-peer network. For example, as illustrated at step 808, after one or more exchanges of communication protocol parameters the method 800 can select, with the one or more processors, a group leader of the ad hoc peer-to-peer network. In one embodiment, the selection of step 808 occurs as a function of the at least one communication protocol parameter and the at least another communication protocol parameter exchanged in steps 803-804 and optionally at decision 805. Where security or encryption is needed, as shown at step 809, the method 800 can negotiate a secure communication channel between the electronic device and a remote electronic device in the ad hoc peer-to-peer network. In one embodiment, this negotiation occurs a function of the at least one communication protocol parameter and the at least another communication protocol parameter exchanged in steps 803-804 and optionally at decision 805. Other negotiation and establishment steps will be obvious to those of ordinary skill in the art having the benefit of this disclosure.

Figure 9:
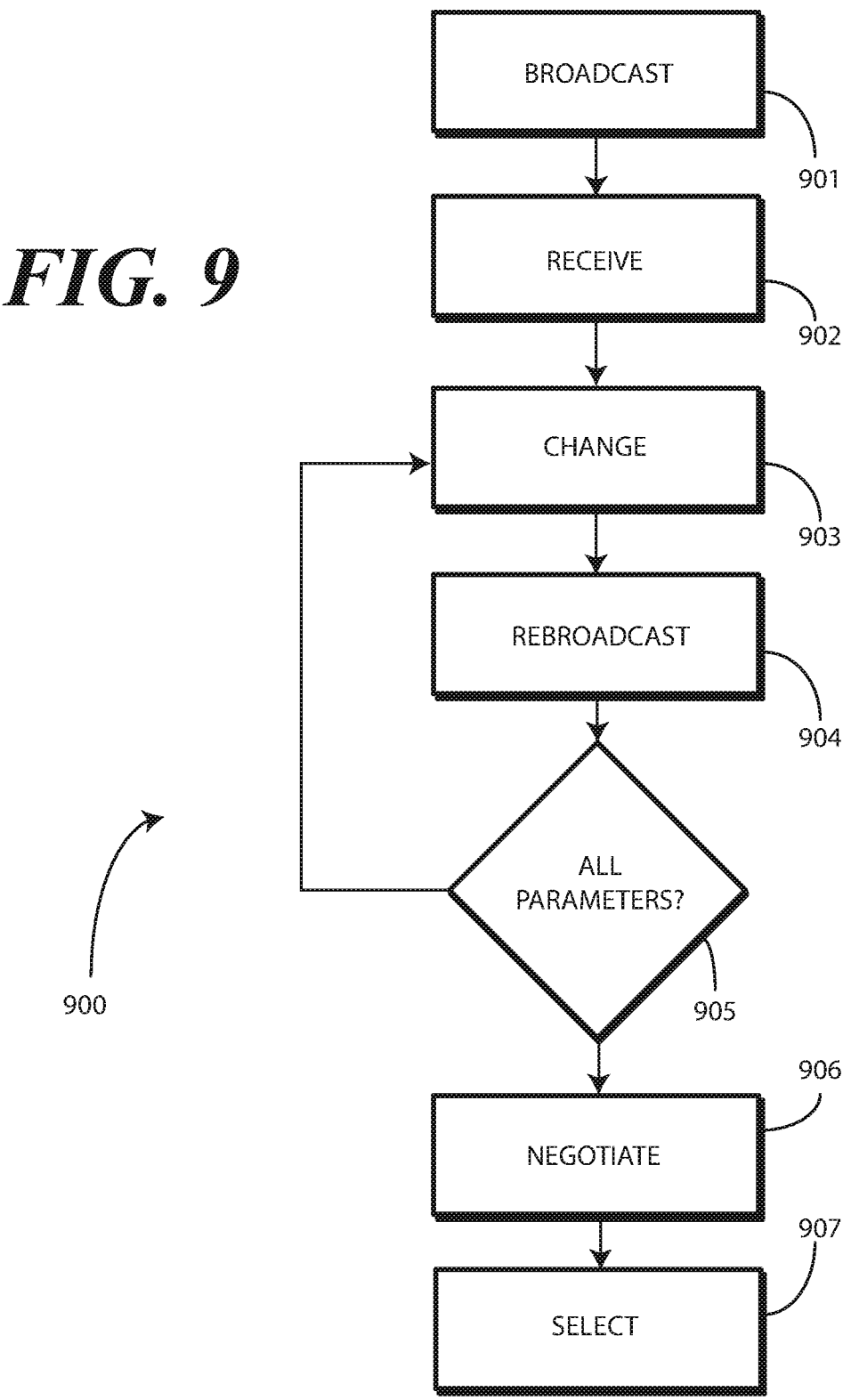
FIG. 9 illustrates one explanatory method in accordance with one or more embodiments of the disclosure.

Turning now to FIG. 9, illustrated therein is an alternate method 900 for of establishing an ad hoc peer-to-peer piconet. At step 901, the method 900 includes broadcasting, with a local area wireless communication circuit of an electronic device, a local name of the electronic device in accordance with a device discovery communication protocol operating at an application layer in the electronic device.

At step 902, the method 900 receives, with the local area wireless communication circuit, a response from a remote electronic device. In one embodiment, the response received at step 902 comprises a simple a response to the broadcasting of the local name from one or more remote electronic devices in accordance with the device discovery protocol. However, in other embodiments, the response received at step 902 comprises a remote device local name of a remote electronic device using the device discovery communication protocol, the remote device local name comprising at least another communication protocol parameter.

At step 903, the method 900 includes changing, with one or more processors operable with the local area wireless communication circuit, the local name to include at least one communication protocol parameter selected from a plurality of communication protocol parameters required for communication in the ad hoc peer-to-peer piconet to form a new local name. At step 904, the method includes rebroadcasting, with the local area wireless communication circuit, the new local name at the application layer to communicate the at least one communication protocol parameter to the one or more remote electronic devices.

At decision 905, the method 900 can optionally include checking to see whether all necessary communication protocol parameters necessary for communicating on the ad hoc peer-to-peer piconet have been exchanged between the respective devices. Where they have not, the method can optionally repeat step 903 and step 904. As with the method of FIG. 8, this repeating can continue until, as shown at step 906, the method 900 negotiates negotiating the roles of the electronic device and the one or more remote electronic devices in the ad hoc peer-to-peer piconet. In one embodiment, as shown at step 907, this negotiation includes selecting, with the one or more processors, a group leader. In one embodiment, this selection occurs as a function of the at least one communication protocol parameter and the at least another communication protocol parameter exchanged in step 903 and step 904.

As illustrated and described, and as in contrast to prior art systems, embodiments of the disclosure employ only a device discovery protocol of a communication protocol, operating only at the application layer in one or more embodiments, to establish ad hoc peer-to-peer networks. Embodiments of the disclosure thus provide a simple, low power solution to the prior art "chicken and egg" problem described above. Moreover, as compared to the prior art solutions, embodiments of the disclosure offer a seamless and more energy efficient method and system for two or more computing devices to discover and connect to each other.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For instance, while many embodiments above are directed to establishment of an ad hoc network, embodiments of the disclosure are not so limited. Embodiments can also be used to solve other problems as well.

Illustrating by example, embodiments of the disclosure contemplate that traditional computing platforms, such as desktop, laptop, palmtop, and tablet computers, are not well equipped in establishing and maintaining reliable peer-to-peer wireless communication networks. Accordingly, in one or more embodiments, the methods and systems described above could be used in a traditional Wi-Fi network to establish a peer-to-peer network between one device that is already operating in a wireless communication network and another device that is not operating in the network. Embodiments of the disclosure can be used by the device already operating in the wireless communication network to communicate various parameters, such as those relating to the access point of the wireless communication network, to the other device so that the other device can communicate in the same network.

For instance, in one embodiment multiple devices can use a predefined device discovery protocol to initiate communication on a peer-to-peer basis. In one embodiment, each device may employ the predefined device discovery protocol to broadcast their local device names. As described above, they may then use the same predefined device discovery protocol to serially broadcast new local names that include at least one communication protocol parameter such as whether they are connected to a wireless communication network, how fast communication occurs on the network, e.g., whether the network a particular device is operating on is operating in accordance with the 802.11g protocol, the 802.11n standard, the 802.11ac standard, and so forth. If different devices are operating on different networks with different speeds, the communication protocol parameter indicating the highest speed, i.e., the fact that one device is operating on a 5 GHz 802.11ac protocol network, could be used for prioritization, with that device becoming the master of the group. Using the predefined device discovery protocol, this device could then instruct the other devices, by serially changing its device name to include additional communication protocol parameters, how to begin communicating on the 802.11ac network. Once each device becomes active on the 802.11ac network, rather than using the predefined device discovery protocol they can begin communicating with each other through regular network protocols over an infrastructure network instead of using the ad hoc peer-to-peer network used initially to determine which network was the fastest and how to access that network's access point. Other applications will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of establishing an ad hoc peer-to-peer network, the method comprising:
broadcasting, with a local area wireless communication circuit of an electronic device, a local name of the electronic device using a predefined device discovery protocol;
changing, with one or more processors operable with the local area wireless communication circuit, the local name to a new local name including at least one communication protocol parameter selected from a predefined plurality of communication protocol parameters required for communication in the ad hoc peer-to-peer network; and
rebroadcasting, with the local area wireless communication circuit, the new local name using the predefined device discovery protocol to communicate the at least one communication protocol parameter.

2. The method of claim 1, further comprising:
repeating:
the changing by substituting in the new local name at least another communication protocol parameter for the at least one communication protocol parameter; and
the rebroadcasting the new local name.

3. The method of claim 2, the repeating continuing until each communication protocol parameter of the predefined plurality of communication protocol parameters is communicated between the electronic device and one or more remote electronic devices.

4. The method of claim 1, the predefined device discovery protocol comprising a Bluetooth device discovery protocol.

5. The method of claim 1, further comprising:
receiving, with the local area wireless communication circuit, a remote device local name of a remote electronic device using the predefined device discovery protocol, the remote device local name comprising at least another communication protocol parameter; and
selecting, with the one or more processors, a group leader of the ad hoc peer-to-peer network as a function of the at least one communication protocol parameter and the at least another communication protocol parameter.

6. The method of claim 1, the new local name comprising an indication of the local name and the at least one communication protocol parameter.

7. The method of claim 6, the indication of the local name and the at least one communication protocol parameter separated by a key.

8. The method of claim 1, further comprising negotiating roles of the electronic device and one or more remote electronic devices in the ad hoc peer-to-peer network by:
repeating the changing, substituting in the new local name at least another communication protocol parameter for the at least one communication protocol parameter; and
repeating the rebroadcasting of the new local name.

9. The method of claim 1, further comprising negotiating a secure communication channel between the electronic device and a remote electronic device in the ad hoc peer-to-peer network by:
repeating the changing, substituting in the new local name at least another communication protocol parameter for the at least one communication protocol parameter; and
repeating the rebroadcasting of the new local name.

10. The method of claim 9, one communication protocol parameter of the predefined plurality of communication protocol parameters comprising a security key.

11. A node, operable to communicate in an ad hoc peer-to-peer network using a predefined communication protocol defined by a predefined plurality of communication protocol parameters, the node comprising:
a local area wireless communication circuit; and
one or more processors operable with the local area wireless communication circuit;
the one or more processors to:
cause the local area wireless communication circuit to broadcast a local name of an electronic device using a discovery protocol of the predefined communication protocol;
change the local name to a new local name including at least one communication protocol parameter selected from the predefined plurality of communication protocol parameters; and
cause the local area wireless communication circuit to rebroadcast the new local name using the discovery protocol to communicate the at least one communication protocol parameter.

12. The node of claim 11, the predefined communication protocol comprising a Wi-Fi communication protocol, the local name comprising a Service Set Identifier (SSID).

13. The node of claim 11, the one or more processors to execute the discovery protocol at an application layer.

14. The node of claim 11, the one or more processors further to:
receive, with the local area wireless communication circuit, a remote device local name of a remote electronic device using the discovery protocol, the remote device local name comprising at least another communication protocol parameter; and
select a group leader of the ad hoc peer-to-peer network as a function of the at least one communication protocol parameter and the at least another communication protocol parameter.

15. The node of claim 11, the one or more processors further to:
repeat changing the local name by substituting in the new local name at least another communication protocol parameter for the at least one communication protocol parameter; and
also repeat the causing of rebroadcasting of the new local name to perform an authentication and handshaking operation to establish communication with at least one remote device in the ad hoc peer-to-peer network.

16. The node of claim 11, the new local name arranged in a predefined format comprising an indication of the local name and the at least one communication protocol parameter.

17. The node of claim 11, the ad hoc peer-to-peer network comprising a one-hop network.

18. A method of establishing an ad hoc peer-to-peer piconet, the method comprising:
broadcasting, with a local area wireless communication circuit of an electronic device, a local name of the electronic device in accordance with a device discovery communication protocol operating at an application layer in the electronic device;
changing, with one or more processors operable with the local area wireless communication circuit, the local name to include at least one communication protocol parameter selected from a plurality of communication protocol parameters required for communication in the ad hoc peer-to-peer piconet to form a new local name;
rebroadcasting, with the local area wireless communication circuit, the new local name at the application layer to communicate the at least one communication protocol parameter.

19. The method of claim 18, further comprising:
receiving, with the local area wireless communication circuit, a remote device local name of a remote electronic device using the device discovery communication protocol, the remote device local name comprising at least another communication protocol parameter; and
selecting, with the one or more processors, a group leader of the ad hoc peer-to-peer piconet as a function of the at least one communication protocol parameter and the at least another communication protocol parameter.

20. The method of claim 18, further comprising negotiating roles of the electronic device and one or more remote electronic devices in the ad hoc peer-to-peer piconet by:
repeating the changing, substituting in the new local name at least another communication protocol parameter for the at least one communication protocol parameter; and
repeating the rebroadcasting of the new local name.

* * * * *